United States Patent [19]

Amano et al.

[11] Patent Number: 5,045,926

[45] Date of Patent: Sep. 3, 1991

[54] TELEVISION IMAGE DISPLAY APPARATUS

[75] Inventors: Toshio Amano, Kanagawa; Osamu Oda, Tokyo, both of Japan

[73] Assignee: Sony Corporation, Tokyo, Japan

[21] Appl. No.: 489,254

[22] Filed: Mar. 5, 1990

[30] Foreign Application Priority Data

Mar. 7, 1989 [JP] Japan .................................. 1-052837
Mar. 7, 1989 [JP] Japan .................................. 1-052838
Mar. 7, 1989 [JP] Japan .................................. 1-052839

[51] Int. Cl.$^5$ ............................................. H04N 9/64
[52] U.S. Cl. .................................. 358/21 R; 358/27; 358/37; 358/166
[58] Field of Search ................... 358/21 R, 27, 37, 166

[56] References Cited

U.S. PATENT DOCUMENTS

| 4,376,952 | 3/1983 | Troiano | 358/38 |
| 4,489,349 | 12/1984 | Okada | 358/32 |
| 4,623,924 | 11/1986 | Wargo et al. | 358/39 |
| 4,746,970 | 5/1988 | Hosokawa et al. | 358/29 |
| 4,799,106 | 1/1989 | Moore et al. | 358/169 |

Primary Examiner—John W. Shepperd
Attorney, Agent, or Firm—Alvin Sinderbrand; William S. Frommer

[57] ABSTRACT

In a television image display apparatus, one field of an input video signal is divided into a plurality of areas in each of which image information is sampled, and an arithmetic processor provides a video control signal on the basis of preset adjusting data received from a memory and the sampled image information. Luminance, chrominance or sharpness levels can be automatically controlled for each field by such video control signal to maintain the video display in an optimum state. Noise problems typically associated with dark images or weak electric fields are eliminated, while improving the image quality by adjusting the video output for each field.

9 Claims, 13 Drawing Sheets

TELEVISION IMAGE DISPLAY APPARATUS

BACKGROUND OF THE INVENTION

1. Field of the Invention

The present invention relates to a television image display apparatus for controlling the video output of a television receiver or the like in a manner to achieve a desired image quality for each field.

2. Description of the Prior Art

In a video output circuit of a television receiver or the like, a variety of output signal control devices are provided, for example, for adjusting the luminance level (brightness and contrast), color level, sharpness and the like of an image on a display screen, and such control devices are normally adjusted by the user.

The image state on the display screen continuously changes depending on the content of each video program, so that, even if the described control devices are adequately adjusted for one program so as to attain the best image quality thereof, it does not ensure that the image quality will remain optimum for a different program. Thus, for example, since visual impressions of displayed images vary significantly with regard to extremely light and dark scenes, maintaining a proper luminance level is difficult. Therefore, if a luminance adjustment is performed during a light video output, the luminance level normally tends to be adjusted by the user towards a slightly darker image. After such luminance adjustment is completed and fixed by the user, the contrast and so forth are thereafter controlled on the basis of such fixed luminance level. Such a fixed luminance level produces an image with "black deformation" or "black separation", which is unsatisfactory, when the video output is changed from a light to a dark video output. Thus, maintaining the best state of the displayed image is difficult.

OBJECTS AND SUMMARY OF THE INVENTION

Accordingly, it is an object of this invention to provide a television image display apparatus which avoids the above-mentioned disadvantages of the prior art.

More specifically, it is an object of the present invention to provide an improved television image display apparatus which automatically maintains a proper luminance level notwithstanding substantial changes in the brightness thereof. Generally, in accordance with an aspect of this invention, one field of an input video signal is divided into a predetermined number of areas and a typical luminance signal in each of the divided areas is sampled to provide image information in respect to each field. Adjustment data is also obtained on the basis of such sampled image information, and a signal for controlling the luminance signal is provided in accordance with the adjustment data, whereby a desired adjustment of the output video signal can be achieved for each field The brightness, contrast, color saturation, sharpness and so forth of the image can be automatically controlled by real-time processing in conformity with the video content of each field.

According to another aspect of the present invention, a television image display apparatus in which an input video signal is processed to form an output image signal which is displayed on a display screen comprises: sampling means for dividing each field of the input video signal into a plurality of areas and for sampling the image information in each of the divided areas, arithmetic processing means for receiving the sampled image information and memory means from which stored preset adjustment data are supplied to the arithmetic processing means so that the latter generates a video control signal on the basis of the sampled image information and the preset adjustment data for controlling the displayed output image as to its brightness, contrast, color, sharpness and the like.

The above, and other objects, features and advantages of the invention, will be apparent in the following detailed description of preferred embodiments of the invention when read in conjunction with the accompanying drawings in which corresponding components are identified by the same reference numerals.

DETAILED DESCRIPTION OF THE PREFERRED EMBODIMENTS

Figure 1:
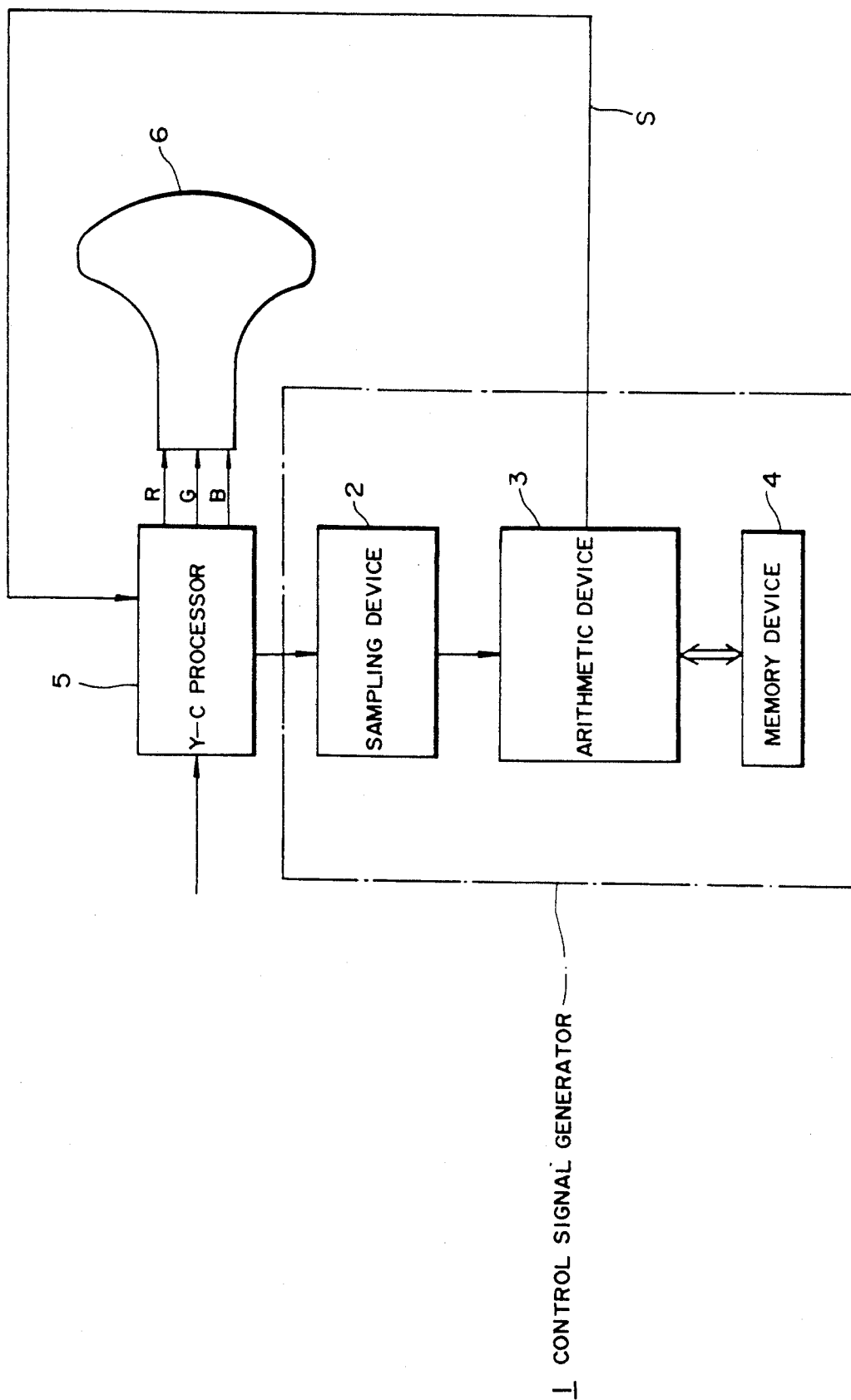
FIG. 1 is a block diagram showing a fundamental arrangement of a television image display apparatus according to the present invention.

As shown in FIG. 1, a television image display apparatus according to the present invention generally comprises a control signal generator 1, a luminance-chrominance (Y-C) processor 5 and a cathode-ray tube (CRT) display unit 6. Control signal generator 1 includes a sampling device 2, an arithmetic device 3 and a memory device 4, and is adapted to sample a signal from processor 5 and to supply an output control signal S to processor 5. The operation of the apparatus shown in FIG. 1 will be apparent from the following detailed description of the preferred embodiments.

Figure 2:
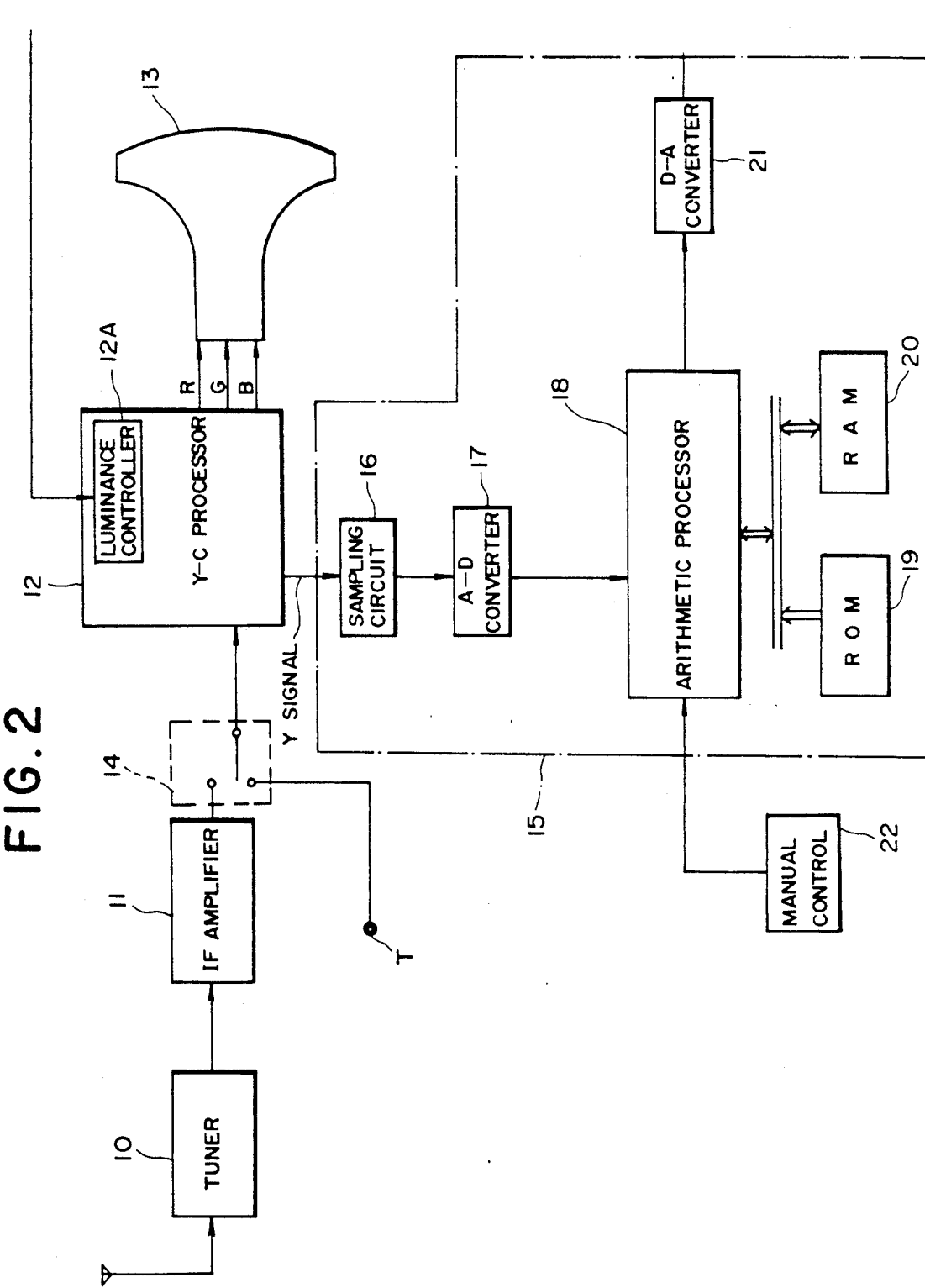
FIG. 2 is a block diagram of a television image display apparatus according to a first embodiment of the present invention.

The television image display apparatus according to a first embodiment of the present invention is shown on FIG. 2 and is provided for controlling a luminance signal in conformity with the state of each field.

The apparatus shown in FIG. 2 comprises a television tuner 10, an intermediate frequency (IF) amplifier 11, a switch 14, a video signal or Y-C processor 12, a cathode-ray tube (CRT) display unit 13 and a luminance control signal circuit 15. A composite video television signal is received through tuner 10 and supplied to IF amplifier 11 wherein the signal is amplified and supplied to one input terminal of switch 14. An input signal T from a video tape recorder (VTR) or such similar device is coupled to the other input terminal of switch 14. Switch 14 is coupled to processor 12 and is adapted to supply one of either the amplified signal from amplifier 11 or the reproduced signal from the VTR to processor 12. Processor 12 is coupled to display unit 13 and is adapted to supply red, green and blue (R, G, B) video signals thereto. Processor 12 is further adapted to supply a video luminance signal (Y) to luminance control signal circuit 15 as hereinafter described.

As shown in FIG. 2, luminance control signal circuit 15 includes a sampling circuit 16, an A-D converter 17, an arithmetic processor 18, a read only memory (ROM) 19, a random access memory (RAM) 20 and a D-A converter 21. Sampling circuit 16 is connected to processor 12 and is adapted to sample, at a predetermined timing, one field of video luminance data so as to obtain luminance data corresponding to the luminance data presented to display unit 13. Sampling circuit 16 is connected to A-D converter 17 which digitizes the sampled luminance information and supplies such digitized information to arithmetic processor 18. Arithmetic processor 18 may include a microcomputer and is adapted to receive the digitized luminance information and to generate a control signal for adjusting the luminance signal level. ROM 19 contains previously stored adjustment data selectively supplied to the arithmetic processor 18 and utilized by the latter in providing the control signal for adjusting the luminance signal level. Rewritable RAM 20 stores user selected adjustment data which are also supplied to arithmetic processor 18 for use in the control signal. The digital control signal from processor 18 is supplied to D-A converter 21 which provides a corresponding analog control signal Sb to a luminance controller 12A. In response thereto, luminance controller 12A adjusts the luminance level of the signal supplied to display unit 13 by adjusting either the respective R G B signal levels or the Y signal level. A manual control 22 is connected to processor 18 and allows the user to manually adjust the luminance level. Although not shown, the output of manual control 22 may be directly supplied to luminance controller 12A rather than to the processor 18.

Figure 3:
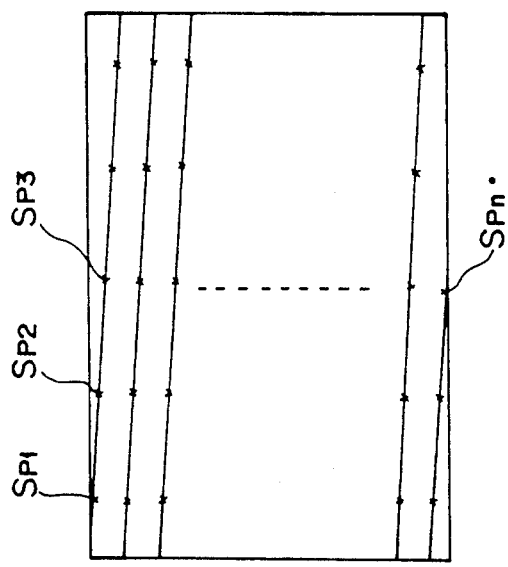
FIG. 3 illustrates signal sampling timing.

The sampling performed by sampling circuit 16 will now be described with reference to FIG. 3. Voltage values of a video signal in one field are sampled at n points, Sp1-Spn, as shown. The sampled information obtained from each of the n points represents a typical value in a respective one of n individual areas. If more precise image information is required, the number of data sampling points can be increased. An optimum number of sampling points may be determined by taking into consideration the processing speed of the arithmetic processor 18 and the additional time that would be required for processing additional sampled data.

The operation of the arithmetic processor 18 will now be described below with reference to the flow charts in FIGS. 4 and 5.

Processing begins, in processor 18, upon receipt of one sample of luminance signal data from sampling circuit 16 through A-D converter 17. As previously mentioned, n samples of luminance signal data are acquired in each field. These n samples are inputted sequentially through A-D conversion, thereby executing data processing steps 100 (1) to 100 (n) in FIG. 4.

Figure 5:
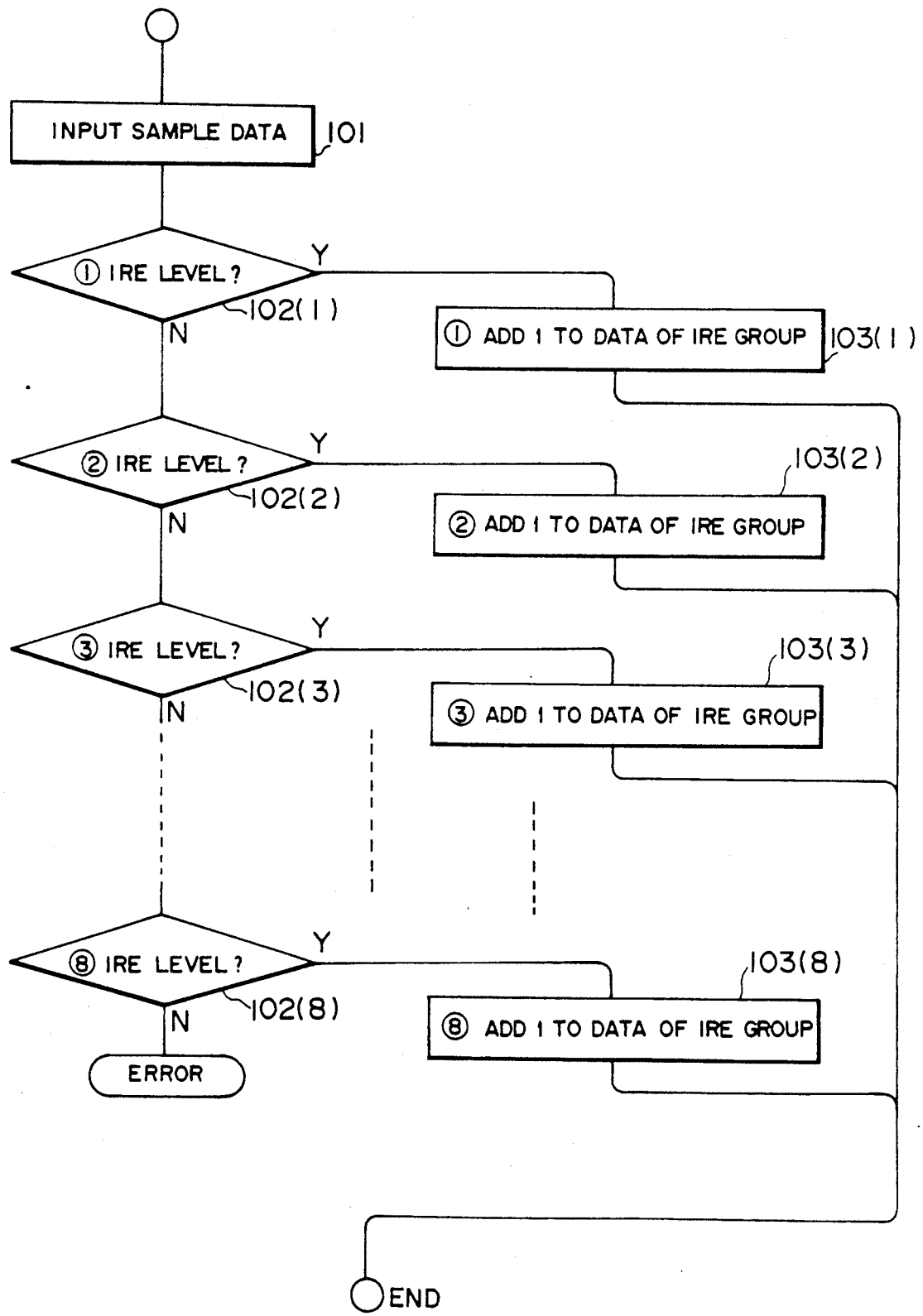

The operation shown in FIG. 5 is performed in each of the steps 100 (1) to 100 (n) so as to decide in which group, as classified by the luminance signal level (IRE level), the input sample of luminance signal data belongs. Such grouped data are then totaled.

The IRE level groups are formed by dividing the IRE range, that is, 0 (IRE)-100 (IRE), into several stages. In the present embodiment, eight stages are utilized. More specifically, data in the 0-12 IRE range are defined as being in (1) IRE group; data in 13-24 IRE range are defined as being in (2) IRE group; . . . ; and data in 88-100 IRE range are defined as being in (8) IRE group. It should be noted that the invention is not limited to the use of eight stages or groups. Thus, the sampled data are grouped or classified by the operations indicated in steps 102 (1) to 102 (8), whereupon the total data in each of the individual obtained groups (1)-(8) are obtained upon completion of the processing of the n sample data of one field.

In other words, when one sample of data is inputted in step 101, a determination is made in steps 102 (1)-102 (8) as to the group in which the sample data belongs, that is, to identify the corresponding IRE level of the sample data signal. Afterwards, in one of steps 103 (1) to 103 (8), 1 point is added to each IRE group to which a sample of data is found to belong.

Figure 4:
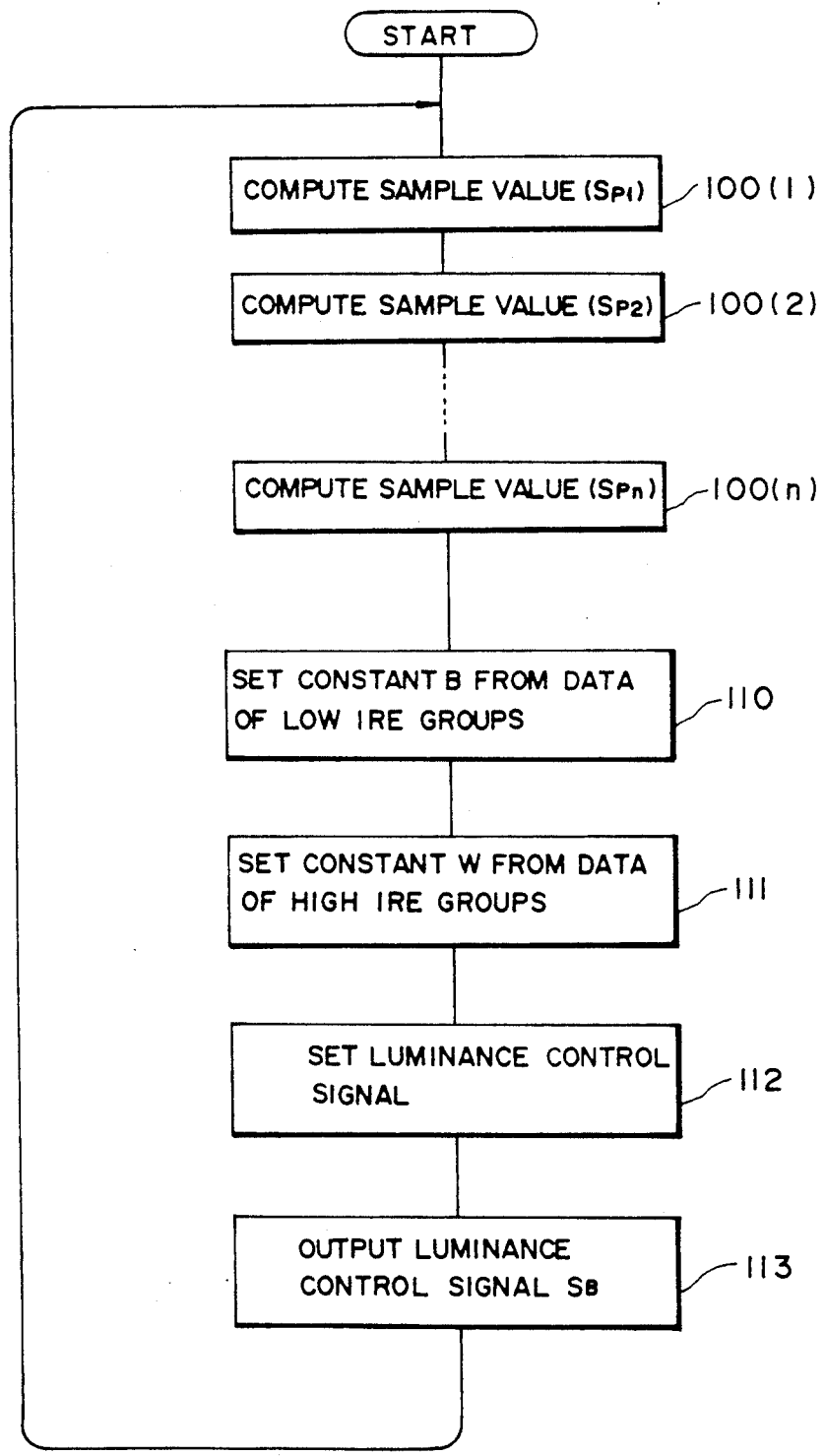
FIGS. 4 and 5 are flow charts for explaining the operating procedure of the first embodiment shown in FIG. 2.

Accordingly, it is to be appreciated that upon completion of the steps 100 (1)-100 (n) in FIG. 4, which involves repeating the operations in FIG. 5 n times, each sampled datum in the entire field has been grouped into a corresponding IRE group and the number of sampled data in each IRE group has been totalled. Arithmetic processing is executed according to the totalled IRE group data, which readily allows determination of the distribution of the luminance levels, including the areas of the individual luminance levels, the lightness and darkness of the entire image and so forth, as displayed on unit 13.

In a step 110 following the step 100 (n) a constant B is set on the basis of the data in the low IRE groups, that is, the total data in the (1)-(4) IRE groups. The constant B is a reference value which represents the "darkness" of the image as shown on display unit 13. Such value can be obtained by computation of the total data in the (1)-(4) IRE groups according to a predetermined rule, or by reading out one of the previously stored adjustment data from ROM 19 on the basis of such total data. An alternate procedure for setting the constant B involves weighing the data in the darkest (1) IRE group through the relatively lighter (4) IRE group and summing up the values thereof. For example, the calculation involving the (1)-(4) IRE groups is executed so that B=((1)×(4))+((2)×(2))+((3)+(4)), where the level "B", represents the entire "darkness" of the displayed image.

A constant W is next set in step 111 on the basis of the data in the high IRE groups, that is, the total data in the (5)-(8) IRE groups. The constant W represents the "lightness" value of the image shown on the display unit 13 and is obtained by a procedure similar to that previously described for step 110.

After determining the constants B and W, which represent the darkness and lightness values, respectively, a luminance level control signal is determined in step 112 on the basis of such two constants B and W. In other words, predetermined calculations are executed utilizing constants B, W and the adjustment data selected from ROM 19 and/or RAM 20, so as to obtain reference data f(B) and f(W). The reference data f(B) and f(W) are added to a signal value N, where N represents a signal controlled to the preadjusted luminance or average luminance level, and the resultant value N +f(B) +f(W) is outputted in step 113 as a control signal $S_B$.

Figure 6A:
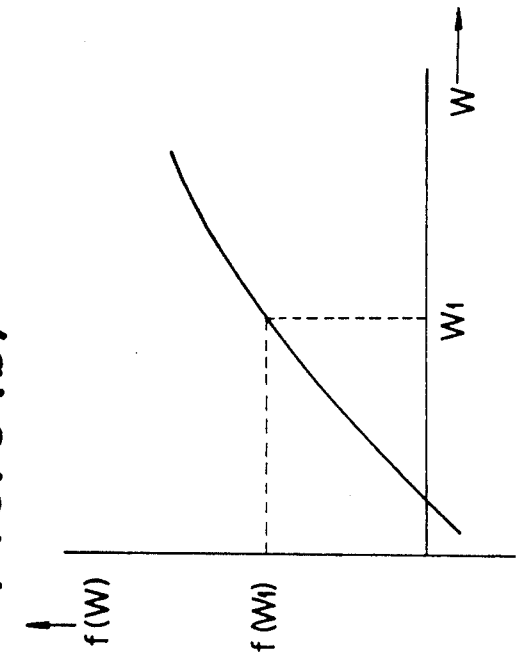
FIGS. 6A and 6B illustrate graphically an operation for setting adjustment data.
Figure 6B:
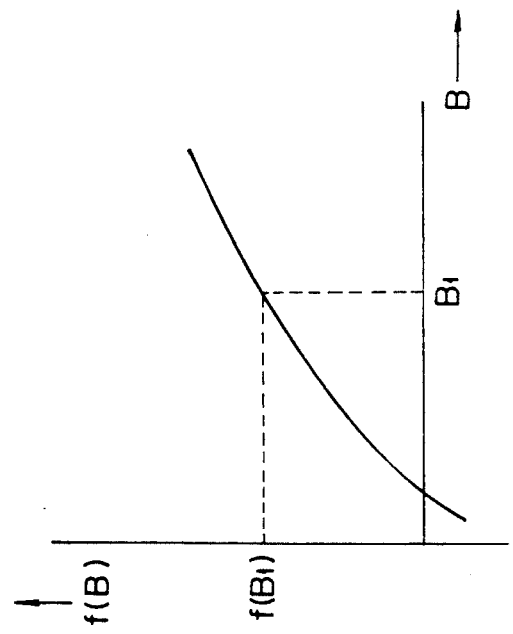

The calculations for obtaining the values f(B) and f(W) may be achieved by storing in ROM 19 arithmetic coefficients for the constants B and W as represented by the curves shown in FIGS. 6(a) and (b), respectively; or by storing in ROM 19 the values f(B) and f(W) which correspond to the constants B and W, respectively, and which arranged in the form of a data table, thereby enabling direct access of the values f(B) and f(W).

Figure 7:
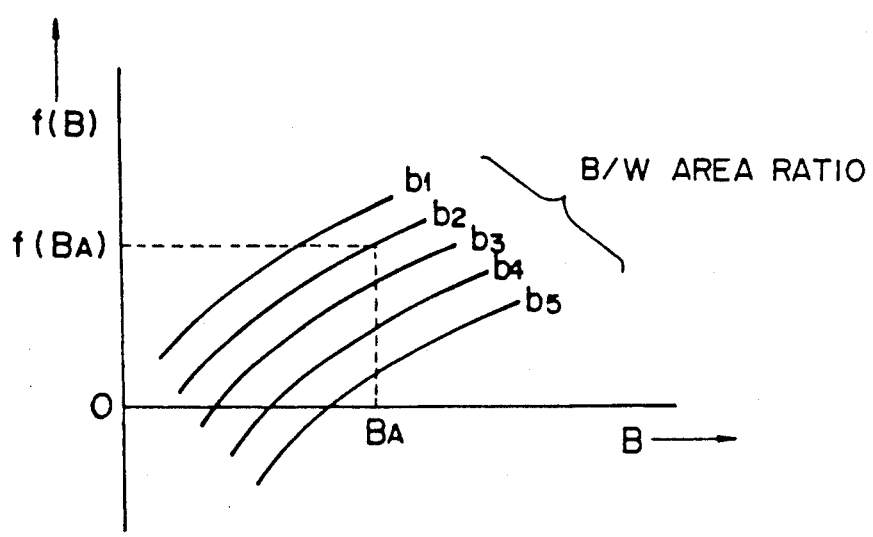
FIG. 7 illustrates graphically another operation for setting adjustment data.

An alternative procedure for setting or determining the control signal $S_B$ in step 112 involves first computing the ratio of the constant B to the constant W which is utilized as data representative of the dark area in the displayed image, and then storing, as an adjustment data group, in ROM 19 a plurality of conversion curves, arithmetic coefficient group or data tables, with various B/W ratios, as shown in FIG. 7. The value f(B) is obtained from both the constant B and the B/W ratio or dark area data. The control signal is set to have the sum of the value f(B) and the value N, which is the normal or nominal luminance-level control signal. For example, as in FIG. 7, when the constant B equals $B_A$ and the ratio B/W corresponds to the curve $b_2$, a value $f(B_A)$ is obtained as the adjustment data, so that the luminance control signal $S_B$ becomes $f(B_A)+N$.

Alternatively, data corresponding to the conversion curves shown in FIGS. 6(a) and (b) or FIG. 7 are prepared. Such conversion curve data for corresponding groups can be stored in multiple memory devices, respectively, and utilized by merely exchanging one memory device for another. Additional selection is also possible by switching the operation modes, that is, switching between using the video constant or the user's personal selection. RAM 20 may be configured to allow the user to write a personalized adjustment data group therein.

The luminance level control signal $S_B$ outputted from arithmetic processor 18 is converted into an analog signal by D-A converter 21, as previously mentioned, and is supplied to luminance controller 12A included within video signal processor 12 as shown in FIG. 2. The video luminance level is controlled by luminance controller 12A on the basis of the control signal $S_B$.

It is to be appreciated that the above operations, including the sampling timing control, arithmetic processing control, memory device control and so forth can be controlled by a system control device (not shown) in the microcomputer.

As the above operations are performed in each vertical synchronizing period, the luminance control signal $S_B$ is outputted for each field so as to adjust the luminance signal level on a field-by-field basis, hence each displayed image contains the proper luminance level. Therefore, automatic control is maintained so as to lower the luminance level in the case of a light image and to raise the luminance level in the case of a dark image, thereby preventing "black deformation" or "black separation" regardless of the video content of each image. Furthermore, proper contrast is similarly maintained.

Figure 8:
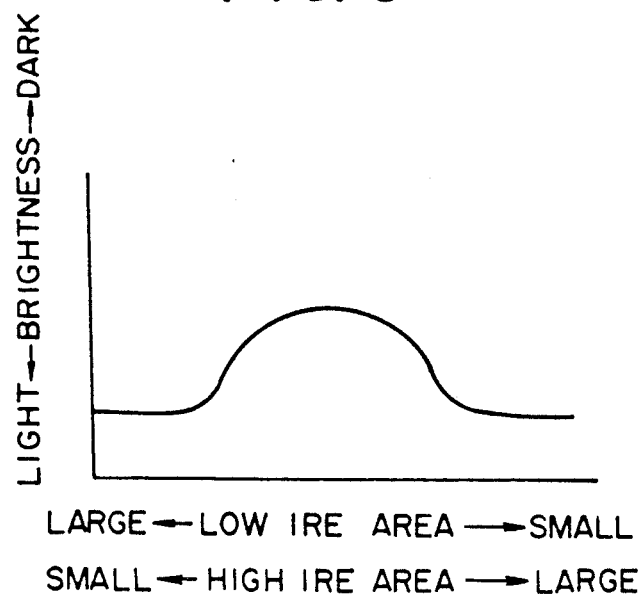
FIG. 8 graphically illustrates an example of luminance signal control.

Since such adjustment is effected with consideration of the black level and white level areas, the luminance level may be adjusted so that the DC transmission factor or brightness control level is lowered when the amount of the data in the low IRE group is either small or large, as graphically shown in FIG. 8, and the DC transmission factor is raised when the data predominantly lies in an intermediate IRE group. A similar adjustment may also be effected in respect to the contrast, and an acceptable result can be obtained by executing such control for both brightness and contrast simultaneously.

In an alternate approach, the luminance signal need not be sampled in each field, but may be sampled in one out of several fields in a group of fields or vertical synchronizing periods. Furthermore, the luminance control may be executed not only during the vertical synchronizing period, but also in the middle of a field. For example, control may be carried out to raise the luminance level in the upper half of the field while lowering the luminance level in the lower half thereof. This can be accomplished by changing the totalization unit of the aforementioned sample data.

In a preferred embodiment the luminance-level control circuit is designated to change with the hysteresis characteristic so that, upon occurrence of over a predetermined level difference, the luminance level is controlled to shift to another level.

A field memory may be provided which successively holds the sampled data therein, so as to make it possible to determine, with high accuracy, both information as to the position of the light or dark areas in the image, and also the state of the present field as compared with that of the preceding field. Therefore, by taking such data into consideration at the time of setting the constants, further enhanced luminance control can be achieved. For example, an adjustment can be performed for each area in accordance with the lightness distribution in one field.

Figure 9:
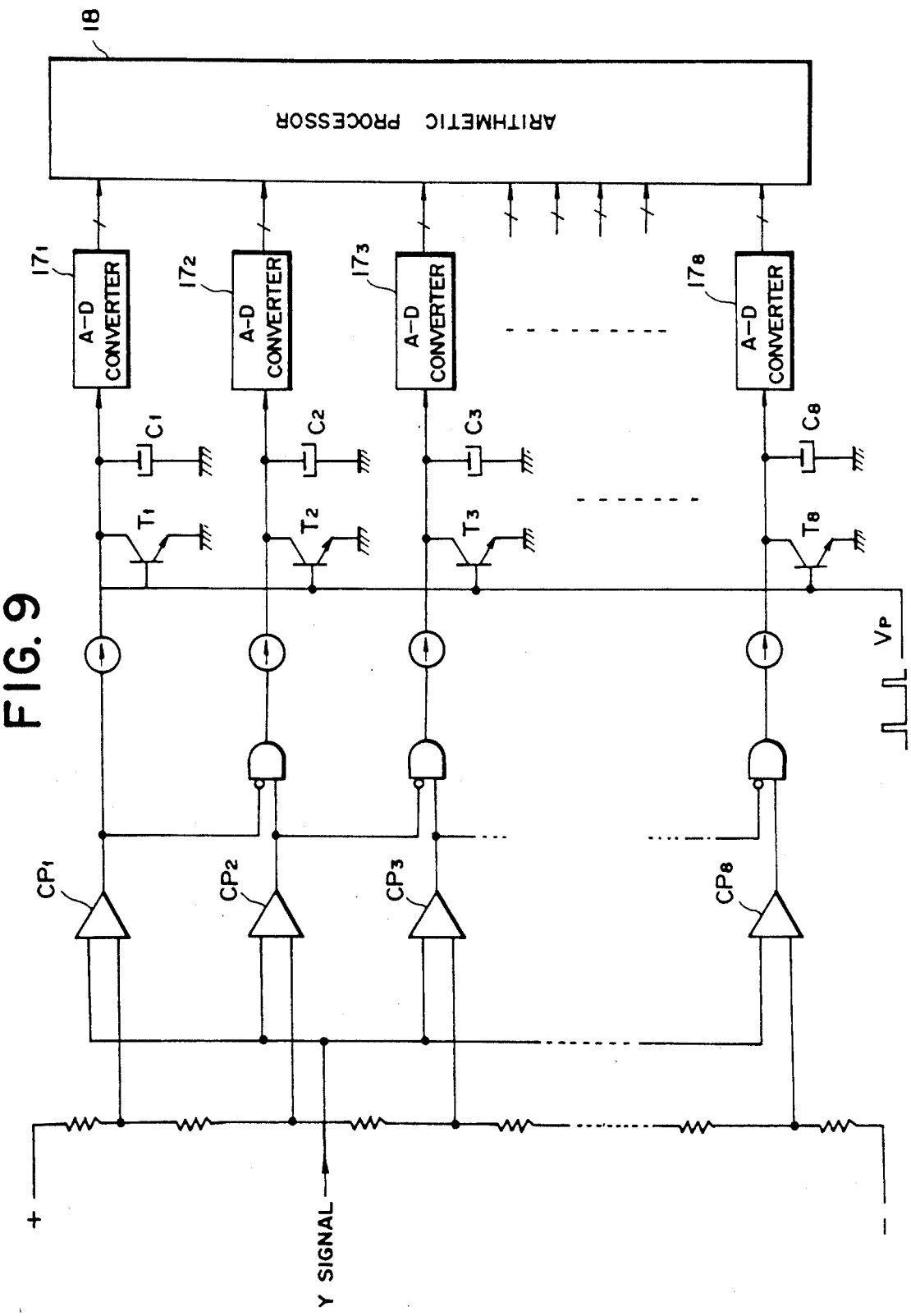
FIG. 9 is a circuit diagram of a sample value totalizer.

The operation of totalizing the luminance distribution, that is, the operation of acquiring the total data in the IRE groups, as performed by the processor 18 with reference to the flow chart of FIG. 5, can be alternatively performed by the circuit shown in FIG. 9.

In the circuit of FIG. 9, the luminance signal inputted at each sampling timing is distributed through one of the comparators CP1-CP8 and stored in a respective one of the capacitors C1-C8 which corresponds to a respective one of the IRE groups. Such action is repeated for one vertical synchronizing period, whereafter the integrated voltage value stored in one of the capacitors C1-C8 is read out therefrom at the instant a vertical synchronizing signal is fed to a respective one of transistors T1-T8. The voltage value thus obtained is A-D converted in one of a group $17_1$-$17_8$ of A-D converters, and the resulting digital value is supplied as a total value of the respective IRE group to arithmetic processor 18.

In a second embodiment of the present invention, the latter is applied to a chrominance signal processor. However, in order that the problems overcome by this embodiment may be fully understood, a chrominance signal processor according to the prior art will be initially described in detail with reference to FIG. 10.

Figure 10:
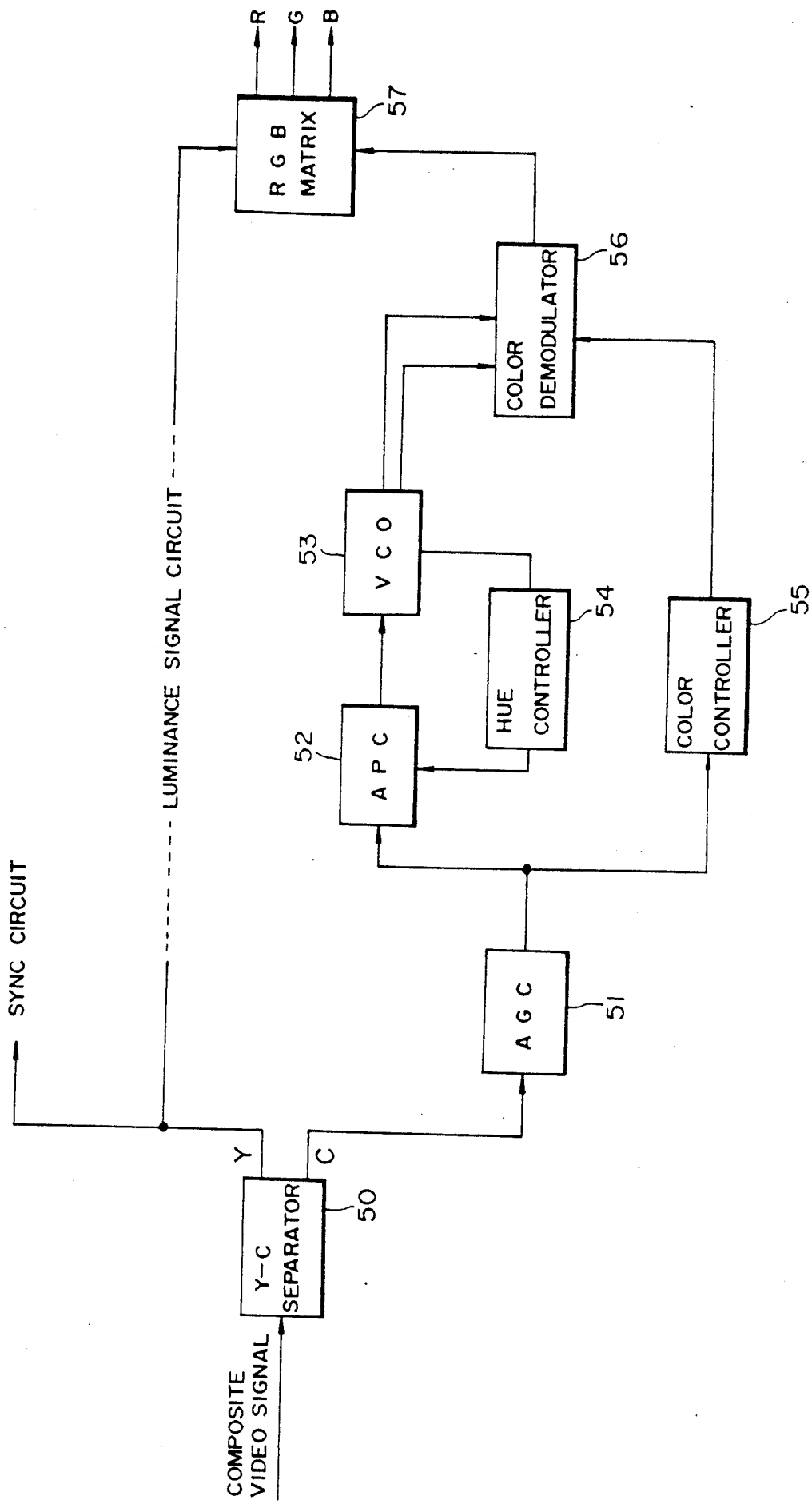
FIG. 10 is a block diagram of a chrominance signal processor according to the prior art.

In such known chrominance signal processor, a composite video signal is first separated into a luminance signal Y and a color or chrominance signal C in a Y-C separator 50, as shown in FIG. 10. The color signal is thereafter inputted to an automatic gain-control (AGC) circuit 51 where the amplitude of a burst signal is controlled. The output signal from circuit 51 is supplied to an automatic phase control (APC) circuit 52 and to a voltage controlled oscillator (VCO) circuit 53 which produces two color subcarrier signals having a 90° phase difference with respect to each other. A hue controller 54 is coupled to VCO 53 so as to adjust the hue by changing the phase between the color subcarrier signal and the burst signal The output signal from circuit 51 is further supplied to a color controller 55 which is capable of adjusting the color density by changing the amplitude of the color signal The output signals of the VCO circuit 53 and color control circuit 55 are supplied to a color demodulator 56. A demodulated color difference signal from demodulator 56, and the luminance signal from Y-C separator 50 are supplied to an R-G-B matrix circuit 57 from which color signals R, G, B are obtained.

In the circuit of FIG. 10, adjustment of the color saturation level in the color controller 55 is normally performed by a user or operator, and thereafter, the color state or density is retained at such fixed set level. However, the video state including lightness, darkness and so forth in the displayed image changes continuously depending upon the video content so that it is difficult to maintain a proper color image in each video scene by the conventional manual control of the color saturation level. Furthermore, in the case of a dark image or a video signal obtained from a received wave having a low electric field strength, the noise associated with the color signal is noticeable, and it is generally assumed that a more acceptable result is achieved by lowering the color level in such case. On the other hand, when the image is light, color insufficiency occurs, so that a better result is achieved by raising the color level The optimum color level also varies depending on the video content. For example, in the case of a scene containing a snow mountain or the like where the white level is high, the color level needs to be lowered; whereas, in a scene containing a lake or the like, the color level needs to be raised. Also, in a colorful scene, for example, one showing various fruits or the like, the color level needs to be raised.

Therefore, the proper or desired color level for each field varies depending on the lightness or darkness of the respective image content, the total level of the chrominance signals in the field, the field strength or received wave level and so forth. Hence, it is impossible to continuously maintain the proper color level merely by setting a fixed control level as in the conventional technique. For example, if a certain control level is set by adjustment when a light video image is displayed, color noise becomes noticeable when the image changes to a dark one.

A second embodiment of the present invention which eliminates the aforementioned problems will now be described with reference to FIG. 11.

Figure 11:
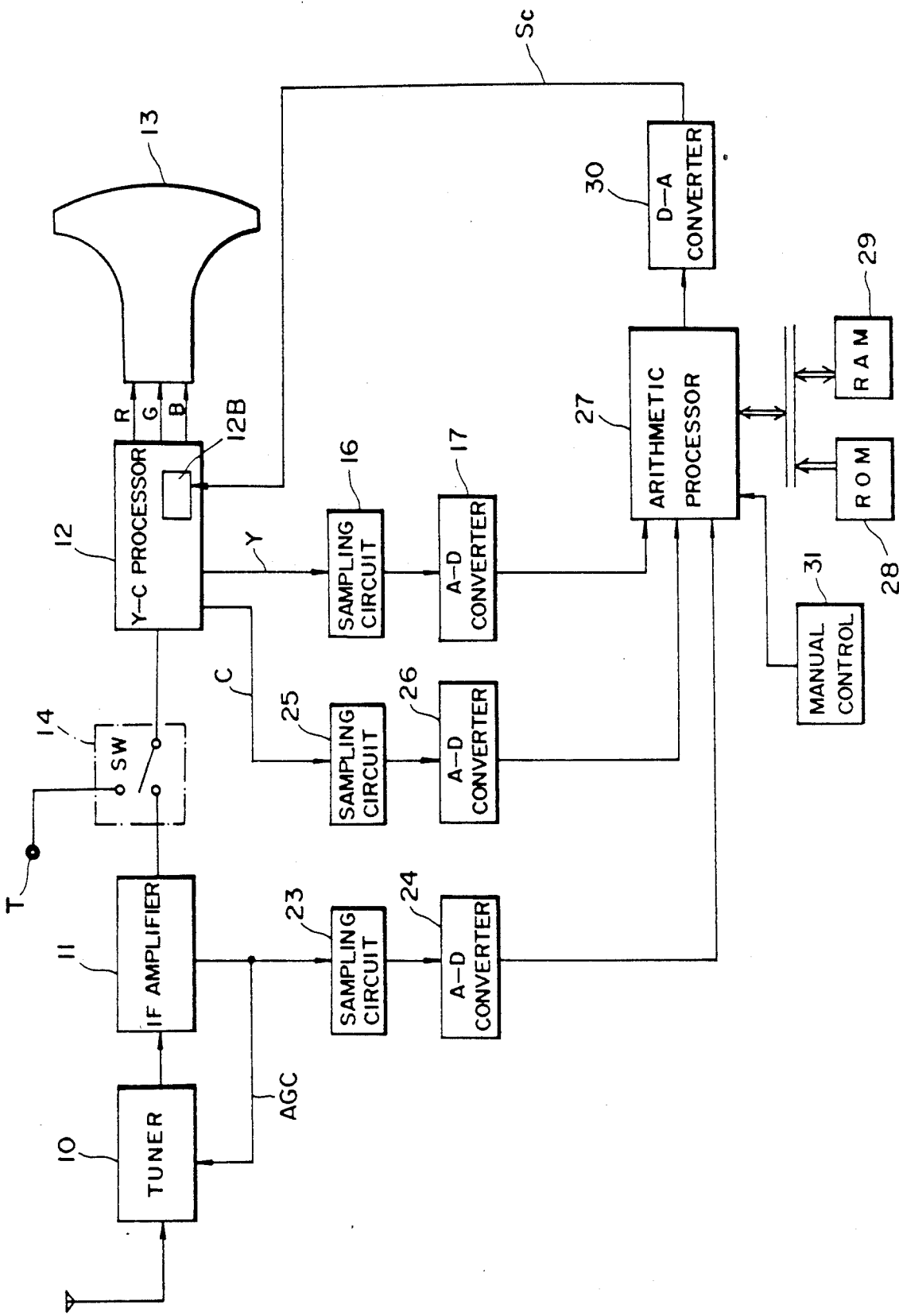
FIG. 11 is a block diagram of a second embodiment of the present invention.

The apparatus shown in FIG. 11 comprises a tuner 10, an IF amplifier 11, a switch 14, a Y-C processor 12, a cathode ray tube (CRT) display unit 13, sampling circuits 16, 23 and 25, A-D converters 17, 24 and 26, an arithmetic processor 27, a read only memory (ROM) device 28, a random access memory (RAM) device 29, a D-A converter 30 and a manual control 31. It is to be appreciated that the elements 10-17 in FIG. 11 are connected similarly to the elements identified by the same reference numerals in FIG. 2 and operate in a similar manner, and those elements will not be further described herein.

In FIG. 11, three sampling circuits 16, 23 and 25 are provided. In sampling circuit 16, a luminance signal supplied to video signal processor 12 is sampled at a predetermined timing in each field. Similarly, in sampling circuit 25, a color signal supplied to video signal processor 12 is sampled in the same manner. Thus, samples of the luminance and color information displayed on a CRT display unit 13 are obtained and supplied to arithmetic processor 27. To obtain information on the received wave level, or electric field strength, an AGC voltage from the IF amplifier 11 is sampled at predetermined timing by the sampling circuit 23.

The three A-D converters 17, 24 and 26 are coupled to sampling circuits 16, 23 and 25, respectively, and are adapted to digitize the signals outputted from the respective sampling circuits; and the arithmetic processor 27, consisting of a microcomputer, receives the digital image data signals from converters 17, 24 and 26 and produces, as its output, a color level control signal resulting from computations performed on the received digital image data signals.

The D-A converter 30, which is connected to arithmetic processor 27, is adapted to convert into an analog signal $S_C$ the color level control signal determined by the operation of the arithmetic processor 27. The analog control signal $S_C$ is supplied to a color controller 12B included in the processor 12 and by which the color level is adjusted in accordance with the control signal $S_C$.

Manual control 31 is connected to arithmetic processor 27 and enables the user to manually adjust the color saturation level.

The operation of arithmetic processor 27 in setting the color level control signal for each field will now be described with reference to the flow chart in FIG. 12.

Upon receipt by processor 27 of a sample of the luminance signal through A-D converter 17 from sampling circuit 16, the processor 27 executes a procedure similar to that hereinbefore described with reference to FIGS. 4 and 5. As previously described, n data samples are obtained per field, and data totalization and so forth are performed upon the n data samples so as to obtain information on the "lightness" level in the image. Simultaneous arithmetic processing is executed by the processor 27 with respect to n data samples of the color signal obtained through A-D converter 26 from sampling circuit 25, whereby color information regarding the color signal distribution and color level is obtained.

Furthermore, in an operation similar to that described above, samples of the AGC voltage data from the sampling circuit 23 are supplied to the processor 27 in an initial step 200 (FIG. 12) and are processed to acquire information on the received wave level or electric field strength. Thereafter, in steps 201 through 207, a color level control signal is set so as to obtain an optimum color level in accordance with the lightness and darkness of the image, the color state and the received wave level. The operations of steps 201 through 207 will now be further described.

Utilizing the electric field strength data input in step 200, it is determined in step 201 whether or not the input video data is from a weak electric field. If the answer is affirmative, the routine proceeds to step 202 in which the processor 27 provides a control signal which lowers the color level. If the answer to step 201 is negative, signifying that the video data is not from a weak electric field, the routine proceeds to step 203 in which the color state of the image is judged according to the total level of the chrominance signal samples from sampling circuit 25. If the resulting total level is high, indicating that the respective field contains a colorful image, the routine proceeds to step 204 in which a control signal is set to raise the color level. When the image is judged not to be relatively colorful in step 203, the routine proceeds to step 205 in which the lightness and darkness of the image are judged according to the luminance signal samples from circuit 16. If the image is judged to be light in step 205, the control signal is set in the step 206 so as to raise the color level. Conversely, if the image is judged to be dark in step 205, the program proceeds to step 207 in which the control signal is set to lower the color level.

An operation for thus setting the control signal may be performed on the basis of a lightness reference value (constant Ⓐ) obtained by totalizing or computing the luminance data samples for one field, a color state reference value (constant Ⓑ) obtained by totalizing the chrominance data samples for one-field, and another value (constant Ⓒ) similarly obtained from the AGC voltage data samples. Using the constants Ⓐ, Ⓑ, Ⓒ as parameters, a control signal is determined by selectively reading out preset adjustment data from ROM 28 and computing the general color level control value therefrom.

In an alternate method, the control signal is determined by recalling previously stored arithmetic coefficients, which correspond to the above constants, from ROM 28 and then computing the constants Ⓐ, Ⓑ and Ⓒ directly from the coefficients that are read out.

As another alternative, a plurality of adjustment data can be stored in ROM 28 so as to enable a control signal to be set on the basis of the information obtained from the luminance signal, color signal and AGC voltage value, that is, constants Ⓐ, Ⓑ and Ⓒ. An optimum color-level control signal can be supplied by various methods through the use of a suitable software program and the microcomputer of processor 27.

The RAM 29 enables a user to write therein desired adjustment data by which personalized color level control may be achieved. The ROM 28 and/or RAM 29 may utilize replaceable cartridges.

Since the above operation is performed in each vertical synchronizing period, a color level control signal is provided for each field so as to adjust the color level of the video signal on a field-by-field basis, and thereby maintain the video output image at a proper color level state. Thus, automatic video control is performed so that the color level is reduced when the received wave level is low or the image is dark, and the color level is emphasized or increased in the case of a colorful or light image. By reason of the foregoing, noticeable noise resulting from the color signal is avoided whether due to the video content, that is, a dark image or a dark portion, or the received wave level or electric field strength. Even in the case of an image where noise is not otherwise noticeable, the present invention achieves significant enhancement of the color display.

It will be appreciated that the D-A converter 30 in FIG. 11 may be omitted, in which case the control signal $S_C$ outputted from arithmetic processor 27 in digital form is directly applied to color controller 12B for adjusting the color level.

Further, a field memory (not shown) may be provided for holding the successive data samples therein. In such case, it is possible to determine both the relatively light and dark portions of the field as well as the color state of the image with higher accuracy and also the state of the present field as compared with that of a preceding field. Therefore, by taking such data into consideration at the time of setting of the constants Ⓐ, Ⓑ and Ⓒ or the execution of the various calculations, further enhanced color level control can be achieved. For example, an adjustment can be performed for each area of the image in accordance with the lightness distribution in the respective field.

Furthermore, in sampling the color signals, the respective signals R, G and B may be sampled individually.

The above described operation of acquiring a certain constant from the information signal for one field which is inputted to the microcomputer in arithmetic processor 27, for example, the totalization of the luminance signal distribution, can also be performed by the circuit of FIG. 9, as in the first described embodiment.

Figure 13:
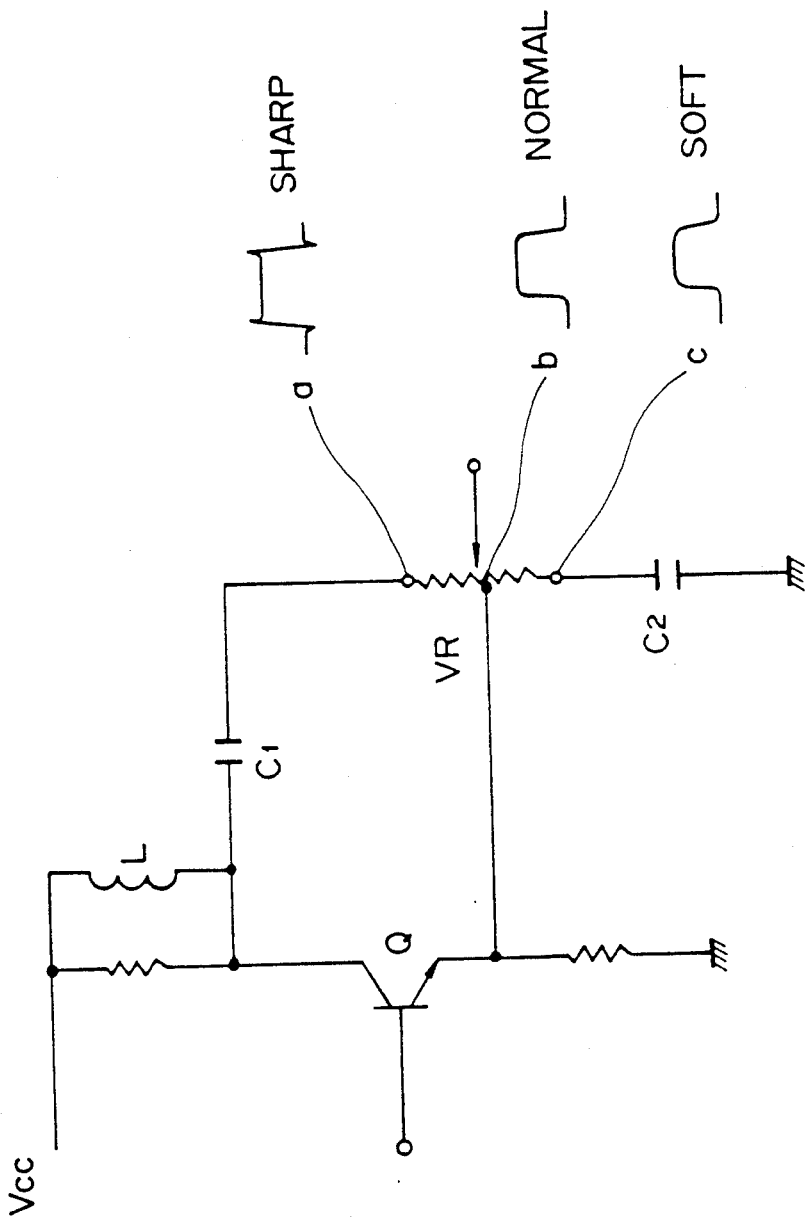
FIG. 13 is a circuit diagram of a sharpness controller according to the prior art.

For the purpose of improving the image quality in a television receiver, a sharpness control device is frequently provided, as illustrated in FIG. 13, which enhances the sharpness of the image by adding preshoot and overshoot to the signal waveform.

In the sharpness control circuit of FIG. 13, a video signal is supplied through a transistor Q to a coil L and a capacitor C1, by which a high-frequency component of the video signal is emphasized thus obtaining a relatively high order differential waveform. The signal component of such waveform is then supplied to a terminal a at one end of a variable resistor VR so that the edge of the video signal as supplied to a slide or intermediate terminal b is emphasized. In such sharpness control device, the image quality is rendered sharp or soft by displacing the slider b of the variable resistor VR toward the terminal a or the terminal c at the opposite end, respectively. Hence, the user can adjust the sharpness to conform with his taste. However, such sharpness control has a disadvantage in that, once adjusted, the sharpness level is generally kept fixed, so that the image quality is deteriorated when the video content is thereafter changed.

Moreover, it is generally believed that image definition is enhanced by raising the sharpness in the case of a light image or lowering the sharpness in the case of either a dark image or an image received with a small electric field strength, that is, a low wave level, since the preshoot and overshoot of the video signal for raising the sharpness of the image emphasize the noise so as to make it noticeable. Thus, a preferred sharpness level varies depending upon the lightness and darkness of the image content, so that the proper sharpness is not attainable by merely setting a fixed sharpness level with a variable resistor or the like.

A third embodiment of the present invention which will be described with reference to FIG. 14 eliminates the aforementioned problem by controlling the sharpness of a video signal for each field in accordance with a control signal determined on the basis of sampled image data for the respective field. Furthermore, the optimum adjustment level of the sharpness controller is set automatically for each field to conform with the video content.

Figure 14:
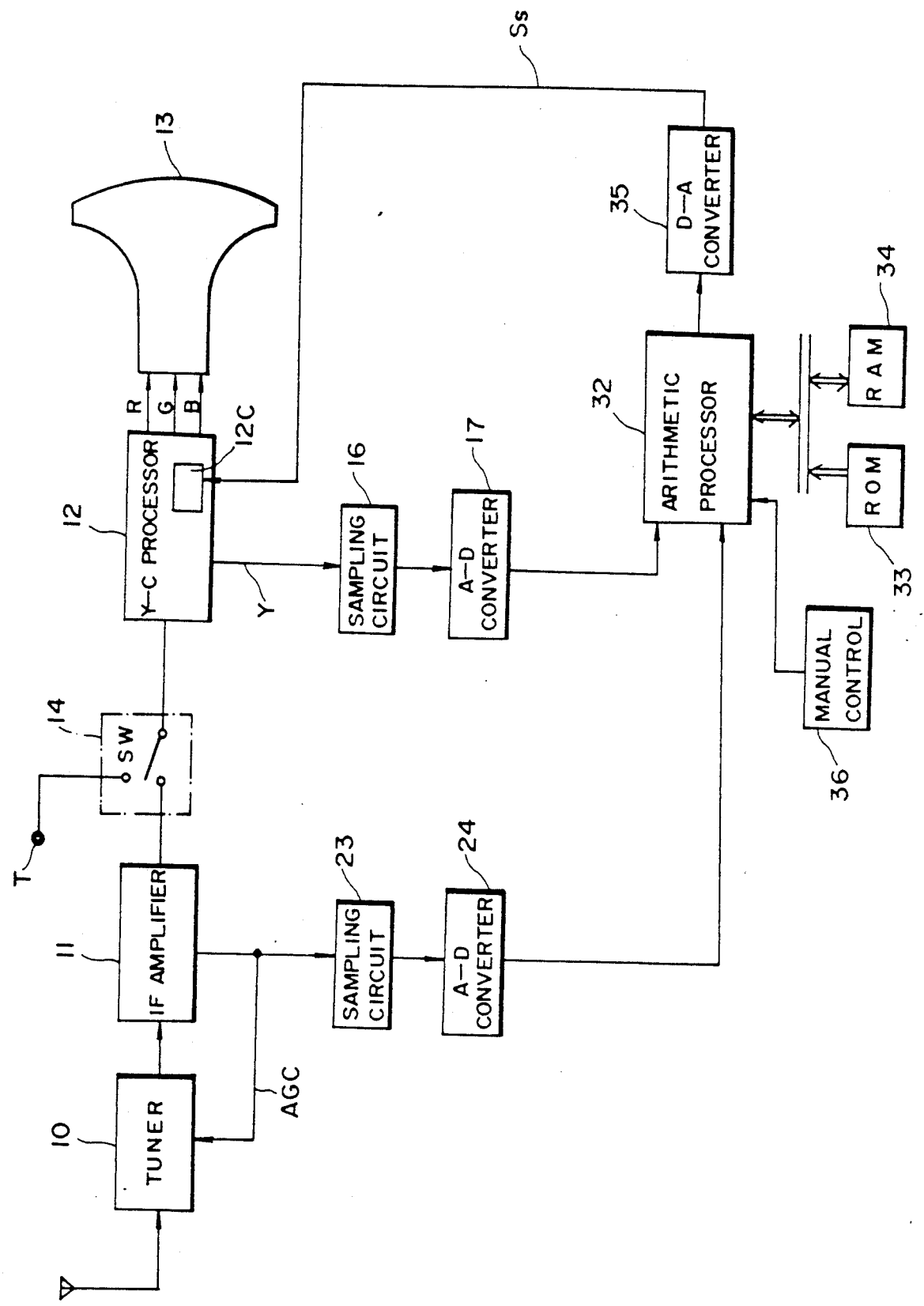
FIG. 14 is a block diagram of a third embodiment of the present invention.

The apparatus in FIG. 14 is shown to comprise elements identified by reference numerals 10-17, 23 and 24 which correspond to the similarly numbered elements in FIG. 11, and which are similarly connected and operate in a similar manner so that further description thereof will be omitted at this time.

In FIG. 14, the A-D converters 17 and 24 digitize the output signals from sampling circuits 16 and 23, respectively, and an arithmetic processor 32, which may be constituted by a microcomputer, executes arithmetic calculations, in a manner similar to that previously described with reference to FIG. 11, on the basis of the image data and the field strength data supplied in digital signal form from A-D converters 17 and 24 and outputs a control signal for performing optimum sharpness control.

Also included in the circuit of FIG. 14 is a D-A converter 35 which is connected to arithmetic processor 32 and is adapted to convert the digital control signal obtained from the arithmetic processor 32 into a corresponding analog signal $S_S$. The analog control signal $S_S$ is supplied to a sharpness controller 12C included in the processor 12 and in which the sharpness level is adjusted by the control signal $S_S$ either directly or indirectly.

A manual control 36 is also connected to arithmetic processor 27 and enables the user to manually adjust the sharpness level.

The operation of arithmetic processor 32 for setting the sharpness level for each field will now be will be described with reference to the flow chart in FIG 15.

Figure 12:
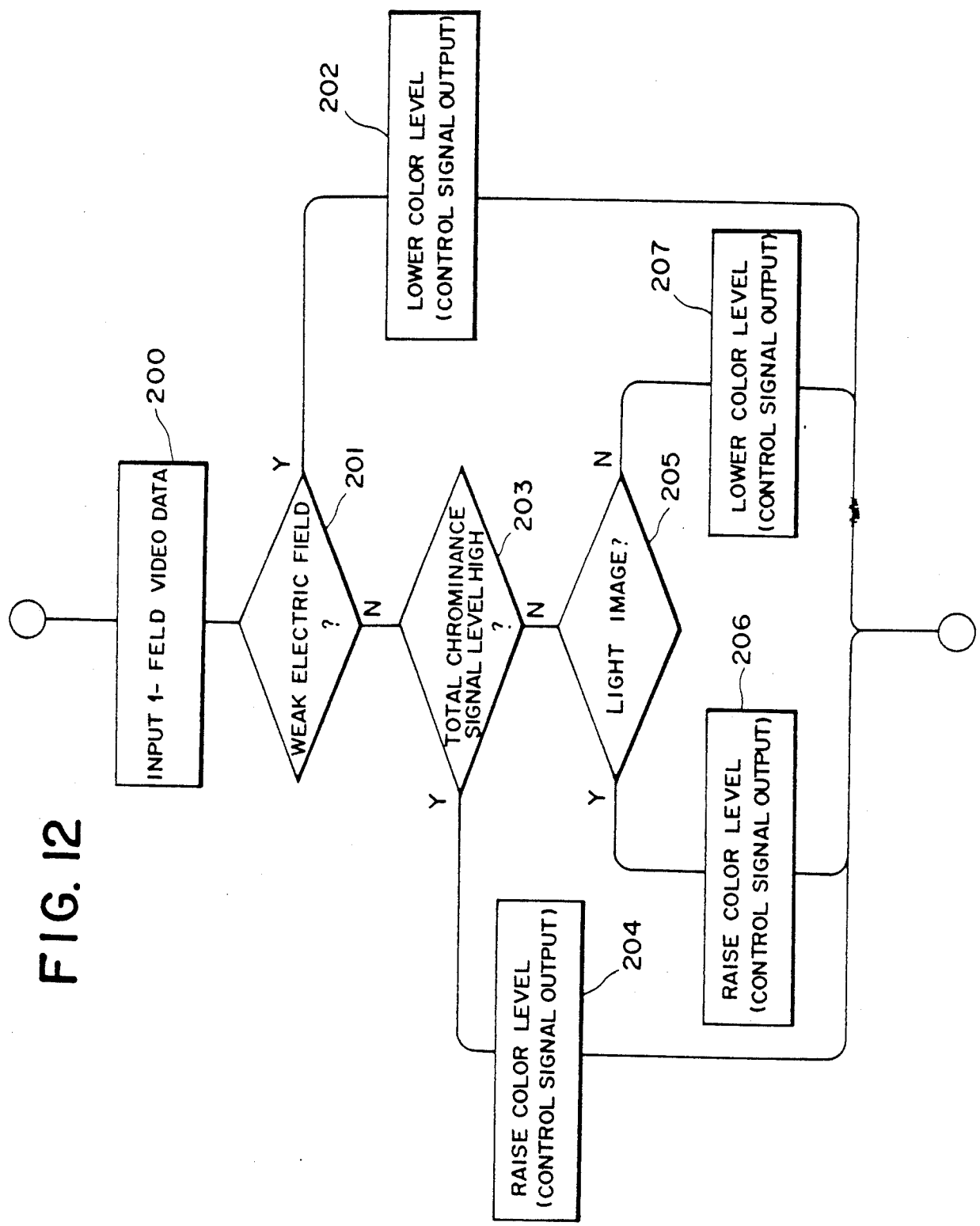
FIG. 12 is a flow chart schematically showing the operating procedure of the second embodiment of the present invention.

In an initial step 300, processor 32 receives samples of the luminance signal supplied from sampling circuit 16 through A-D converter 17 and a processing procedure similar to that described with reference to FIG. 12 is executed. More specifically n data samples are obtained for each field, and data totalization and so forth are performed upon the n data samples, whereby information on the "lightness" or "darkness" of the image is obtained. Furthermore, data samples of the AGC voltage level are supplied from the sampling circuit 23 and processed to produce information on the level of the received wave or electric field strength Thereafter, a control signal is set to obtain the optimum sharpness in accordance with the lightness of the image and the received wave level More specifically, in a step 301 following the step 300, it is determined whether or not the sampled data for a field represents a "dark" image. If the answer to step 301 is affirmative, the program proceeds to a step 302 in which the sharpness level is lowered for accommodating the dark image. On the other hand, in the case of a light image, that is, when step 301 has a negative answer, the program proceeds to a step 303 in which it is determined whether or not the received video signal had a weak electric field. If the answer to step 303 is affirmative, the sharpness level is lowered in the next step 304. On the other hand, if the electric field was strong, the sharpness level is raised in a step 305.

Figure 15:
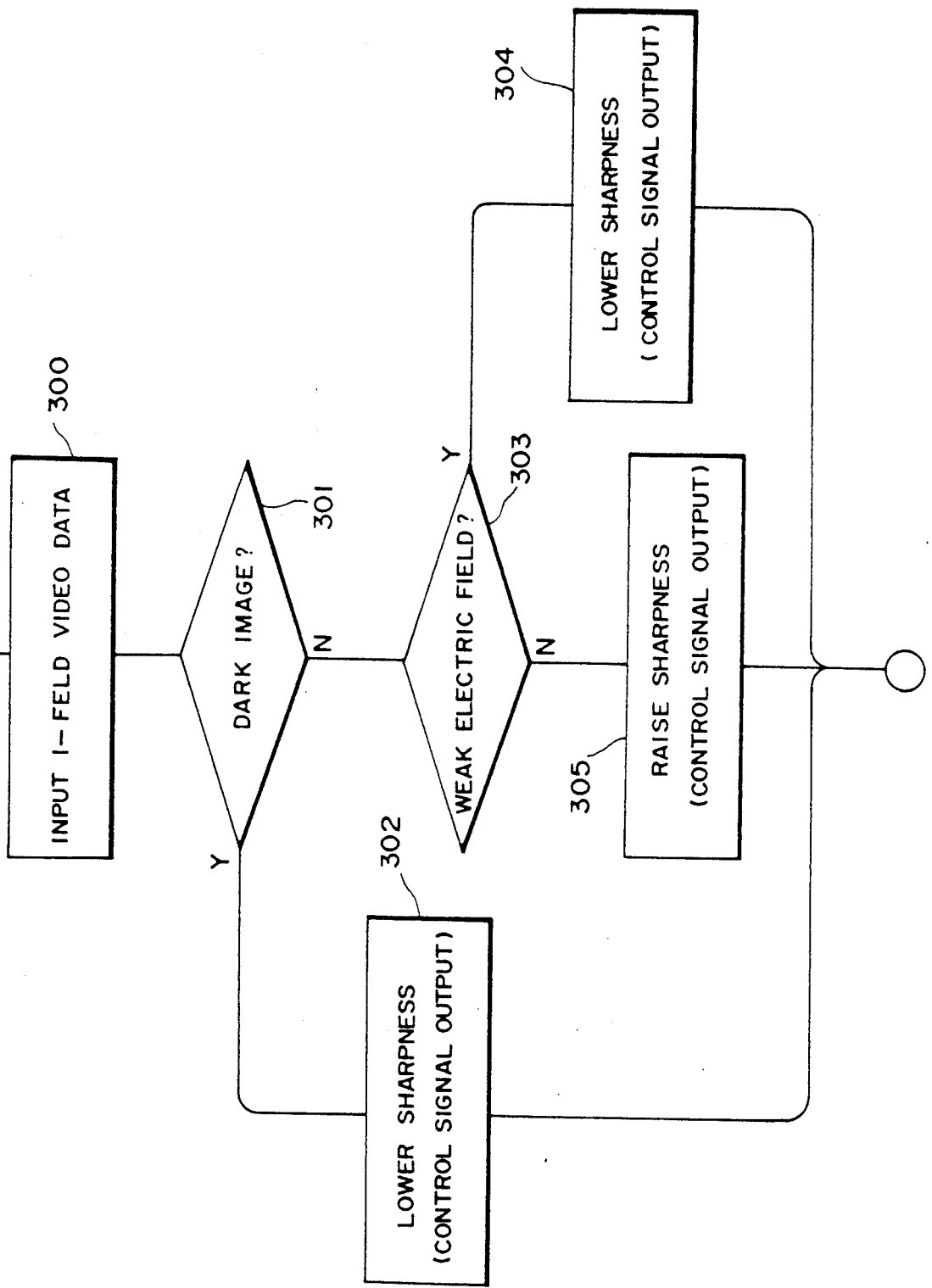
FIG. 15 is a flow chart showing the operating procedure of the third embodiment of the present invention.

An operation for setting the control signal produced by processor 32 in accordance with the program of FIG. 15 may be performed on the basis of a lightness reference value (constant (A)) obtained by either totalizing the samples of the luminance signal for one field or by computing such sample values, and also on the basis of another reference value (constant (C)) obtained from the AGC voltage. The control signal is determined by reading out adjustment data from a ROM 33 with the constant (A) initially used as a parameter and then with the constant (C) used as a parameter in a manner similar to that previously described.

The control signal may be obtained directly from the values of such constants (A) and (C). In such a case, arithmetic coefficients corresponding to the constants (A) and (C) are stored as table data in the ROM 33 so as to enable direct access thereof and are subsequently combined to form the control signal as previously described.

As an alternative, a plurality of adjustment data may also be previously stored in the ROM 33 so that a desired control signal can be set on the basis of the information obtained from both the luminance signal and the AGC voltage value; that is, constants (A) and (C).

The provision of a RAM 34 enables the user to write therein desired adjustment data for attaining personally desired sharpness characteristics.

The above described operations are performed in each vertical synchronizing period so as to provide a sharpness control signal for each field, thereby adjusting the sharpness of the video signal on a field-by-field basis and producing a video output image with its properly maintained sharpness. It will be appreciated that automatic control is executed such that, for example, when the received wave level or field strength is high and the image is light, a sharp video output can be obtained with the addition of overshoot and preshoot. On the other hand, when the image is dark or the received wave level is low, a soft video output can be obtained with a signal having a gentle rise in its waveform.

Thus, it becomes possible to eliminate the noticeable noise that otherwise appears depending upon the video content, that is, in any dark image or dark image portion, or when the received wave level is low or weak. Furthermore, enhanced sharpness can be ensured in any image where noise is not noticeable.

In the television image display apparatus according to the present invention, as described hereinabove, any of the luminance, chrominance and sharpness can be automatically controlled for each field in accordance with the video signal or the image state so as to maintain the video display in the optimum state. In particular, in the case of a dark image or a weak electric field signal, the appearance of noise can be easily avoided while realizing an improvement in the image quality.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

What is claim is:

1. A television image display apparatus in which an input video signal is processed to form an output image signal for display on a display screen, said apparatus comprising:

sampling means for dividing a field of said input video signal into a plurality of areas and for sampling image information in each of said areas which includes a chrominance signal;

memory means for storing preset adjustment date; and arithmetic processing means for receiving the sampled image information and said preset adjustment data and, on the basis thereof, generating a video control signal which controls a color level of said output image signal to be displayed.

2. A television image display apparatus in which an input video signal is processed to form an output image signal for display on a display screen, said apparatus comprising:

sampling means for dividing a field of said input video signal into a plurality of areas and for sampling image information in each of said areas which includes data representing the electrical field strength of said input video signal;

memory means for storing preset adjustment data; and arithmetic processing means for receiving the sampled image information and said preset adjustment data and, on the basis thereof, generating a video control signal which controls a color level of said output signal to be displayed.

3. A television image display apparatus in which an input video signal is processed to form an output image signal for display on a display screen, said apparatus comprising:

sampling means for dividing a field of said input video signal into a plurality of areas and for sampling image information in each of said areas which includes data representing the electrical field strength of said input video signal, and data representing a luminance component and a chrominance component of said input video signal;

memory means for storing preset adjustment data; and arithmetic processing means for receiving the sampled image information and said preset adjustment data and, on the basis thereof, generating a video control signal which controls a color level of said output image signal so as to increase said color level in response to a high level of said chrominance component and also in response to a light image represented by said luminance component, and so as to decrease said color level in response to a weak electrical field of said input video signal and a dark image represented by said luminance component.

4. A television image display apparatus according to claim 3; in which said video control signal is determined field-by-field.

5. A television image display apparatus in which an input video signal is processed to form an output image signal for display on a display screen, said apparatus comprising:

sampling means for dividing a field of said input video signal into a plurality of areas and for sampling image information in each of said areas which includes data representing the electrical field strength of said input video signal, and data representing a luminance component of said input video signal and from which the lightness of a respective image can be determined;

memory means for storing preset adjustment data; and arithmetic processing means for receiving the sampled image information and said preset adjustment data and, on the basis thereof, generating a video control signal which controls sharpness of said output image signal so as to increase said sharpness in response to a luminance component corresponding to a light image and a strong electrical field, and so as to decrease said sharpness in response to a luminance component corresponding to a dark image and a weak electrical field.

6. A color television receiver in which an input video signal is processed to form an output image signal comprising:

sampling means for dividing a field of said input video signal into a predetermined number of areas and for sampling image information in each of said areas which includes data representing an electrical field strength of said input video signal;

memory means for storing preset adjustment data; and arithmetic processing means for receiving the sampled image information and said preset adjustment data and generating a control signal on the basis of said sampled image information and said preset adjustment data for controlling a color level of said output image signal.

7. A television receiver in which an input video signal is processed to form an output image signal comprising:

sampling means for dividing a field of said input video signal into a predetermined number of areas and for sampling image information in each of said areas which includes data representing an electric field strength of said input signal;

memory means for storing preset adjustment data; and arithmetic processing means for receiving the sampled image information and said stored preset adjustment data and generating a control signal on the basis of said sampled image information and said preset adjustment data for controlling the sharpness of said output image signal.

8. A color television receiver according to claim 7; wherein said sampled image information further includes data representing luminance and color components of said input video signal.

9. A television receiver according to claim 7; wherein said sampled image information further includes data representing a luminance component of said input video signal.

* * * * *